United States Patent Office

3,804,719
Patented Apr. 16, 1974

3,804,719
ADSORBING AND CROSSLINKING ENZYMES WITHIN THE PORES OF POROUS GLASS
Ralph A. Messing, Horseheads, N.Y., assignor to Corning Glass Works, Corning, N.Y.
No Drawing. Filed Aug. 7, 1972, Ser. No. 278,269
Int. Cl. C07g 7/02
U.S. Cl. 195—68          8 Claims

ABSTRACT OF THE DISCLOSURE

Enzymes are crosslinked within the pores of porous glass with a water insoluble crosslinking agent dissolved in an organic solvent.

BACKGROUND OF THE INVENTION

This invention relates to the stabilization, insolubilization and immobilization of enzymes so that the enzymes can be used repeatedly without significant loss in activity or amount. As used herein, the terms "stable" or "stabilized," when applied to enzymes, refers to enzymes which demonstrate a substantial retention of their activity or ability to catalyze reactions over a prolonged period of time. "Insoluble" or "insolubilized" refers to enzymes which have been made essentially water-insoluble. The terms "immobile" or "immobilized," when applied to enzymes, refer to enzymes which have retained their shape or conformation generally required for catalysis.

Enzymes are biological catalysts capable of initiating and governing a chemical reaction without being used up in the process or becoming a part of the product formed. All known enzymes are proteins. They are naturally synthesized by animals, plants, and microorganisms and are water-soluble.

Because of their known ability to catalyze specific reactions, enzymes have been used in analytical procedures, and in the preparation of chemical, pharmaceuticals, and foodstuffs. There have been several objections, however, in the use of enzymes which have limited their usefulness. Some disadvantages in using enzymes are their instability, availability, removal and cost. Various methods have been devised for overcoming those disadvantages.

PRIOR ART

It has been known for some time that some of the disadvantages associated with enzyme usage can be avoided or at least minimized by making the enzymes water-insoluble. By being insolubilized, the enzymes can be easily removed from a reaction by well-known means and used for repeated catalyses. Alternatively, insolubilized enzymes can be used repeatedly by continuously or periodically allowing solutions to come in contact with the enzyme composites in flow-through operations. Further, it has been found that by insolubilizing enzymes, their stability is generally enhanced.

Thus, insolubilized enzymes have been shown to avoid or minimize many of the disadvantages associated with the use of soluble enzymes. Since insolubilized enzymes can generally be used for the same purposes that soluble enzymes are used, increasing attention has been directed toward finding the most effective and efficient ways to insolubilize enzymes.

Enzymes have been insolubilized in a variety of ways. For example, enzymes can be copolymerized or crosslinking agents to become relatively insoluble in water. Further, enzymes have been bonded to a wide variety of insoluble organic carriers. For example, in U.S. Pat. No. 2,717,852, there is taught a method for adsorbing an enzyme to activated carbon. The thus-adsorbed enzyme can then be placed in a column to facilitate flow-through catalysis.

Enzymes, such as papain, have also been adsorbed on collodion membranes and then crosslinked with various crosslinking agents. See, for example, Goldman et al., Biochem., vol. 7, 486 (1967), and Goldman et al., Science, vol. 150, 758 (1965). Enzymes have also been microencapsulated in artificial cells and entrapped in a gel lattice. See, for example, Chang, Science Tools, the LKB Instrument Journal, vol. 16, No. 3, p. 33 (1969). Enzymes have also been insolubilized by diazotizing them to cellulose derivatives and polyaminostyrene beads.

It has been recognized, however, that there are various disadvantages in using the above organic materials for insolubilization of enzymes. Some of the main disadvantages in using such organic materials are (a) that they are subject to microbial attack; (b) substrate diffusion within organic carriers is in many cases limited, thereby decreasing apparent enzyme activity; (c) some organic carriers are unstable and they cannot withstand such precoupling treatments as heat sterilization; and (d) when used in columns, pH variations and solvent conditions increase or decrease swelling of the organic materials and this affects the flow rates of substrate solutions through the column. Further, the flexibility of many organic carriers may adversely affect the conformation of enzymes in a turbulent environment, thereby reducing the enzyme's activity.

The above disadvantages associated with the use of organic carriers were overcome to some extent by the discovery that enzymes could be insolubilized by attachment to water-insoluble inorganic carriers such as porous glass. Thus, for example, it was shown in U.S. Pat. No. 3,556,945 that enzymes could be insolubilized by adsorption on inorganic carriers. Further, it has been shown that enzymes can be chemically coupled to inorganic carriers by intermediate groups. See U.S. Pat. No. 3,519,538. Also, enzymes have been adsorbed as monolayers onto colloidal silica particles then crosslinked. See Haynes et al., Biochemical and Biophysical Research Communications, vol. 36, No. 2, p. 235 (1969).

Although enzymes are remarkably stable when adsorbed or coupled to the surface of inorganic carriers, the amounts of enzymes that can be insolubilized on the surface are rather low due to the limited surface area available. In addition, if enzymes are chemically coupled to inorganic carriers there are cumbersome and costly multistep procedures which must be followed.

Thus, even when a porous inorganic carrier is used to insolubilize enzymes, the amount of enzyme that can be attached to the carrier is limited by available surface area available since only the enzymes in contact with the surface area will be retained for long periods of time. Attempts to more fully utilize the available volume in the pores of inorganic carriers have been unsuccessful. For example, attempts have been made to crosslink enzymes within the pores of inorganic carriers. However, such attempts have not been able to overcome the problem of moving the crosslinking agent from an outer solution into the pores without displacing the enzymes within the pores. Further, when crosslinking agents were introduced into the pores first, it was found impossible to later introduce the enzyme into the pores without an outflowing of the crosslinking agent. For example, a well-known water soluble crosslinking agent such as glutaraldehyde could not be used to crosslink enzymes within the pores of inorganic carriers because of the above problems. Thus, there has been no known way to fully utilize the porous volume of inorganic carriers to immobilize enzymes.

The present discovery provides methods for overcoming the above problems. I have found two procedures by which enzymes can be adsorbed on the inner surfaces and crosslinked within the pores of inorganic carriers.

SUMMARY OF THE INVENTION

Quite surprisingly, I have discovered that enzymes can be crosslinked within the pores of an inorganic carrier by choosing a water-insoluble crosslinking agent. The use of an essentially water-insoluble crosslinking agent, then, offers two paths for successfully accomplishing both adsorption and crosslinking within the pores and on the surface of the carrier.

PROCEDURE NO. 1

Enzymes are first adsorbed from an aqueous solution into the pores and on the surface of an inorganic carrier such as porous glass. The carrier is then removed from the aqueous enzyme solution. The glass is then exposed to or contacted with an organic solvent such as alcohol, ether, and the like, containing the crosslinking agent for sufficient time to assure crosslinking within the pores. Since the enzyme is essentially insoluble in the organic solvent, it cannot move out of the pores into the outside solvent. However, the crosslinking agent will migrate into the pores and bring about crosslinking because it will remain in solution with varying concentrations of organic solvent and water. After crosslinking of the enzymes within the pores of the carrier, the carrier is removed from the organic solvent.

PROCEDURE NO. 2

Alternatively, an organic solvent such as alcohol, ether, or the like, containing the essentially water-insoluble crosslinking agent is first added to or contacted with the dry, porous carrier in either minimum volume such that the solution is completely absorbed by the porous carrier present, or in a larger volume with the subsequent removal of excess solvent by decantation or evaporation. Then, the porous carrier with water-insoluble crosslinking agent is exposed to an aqueous enzyme solution. The enzyme migrates into the pores where it is adsorbed and crosslinked, but the water-insoluble crosslinking agent cannot readily move out of the pores and into the aqueous medium. After the enzyme has been adsorbed and crosslinked within the pores of the carrier, the carrier is removed from the aqueous enzyme solution.

By means of the above procedures, three goals are accomplished. First, a greater amount of the pore volume is utilized for insolubilizing enzymes, thus permitting greater amounts of enzyme to be insolubilized by a given amount of carrier. Second, since a greater amount of enzyme is securely contained within the protective pores, less enzyme will be lost when the insolubilized enzyme composite is exposed to a turbulent reaction environment. Third, because of the greater rigidity of the inorganic carrier, a higher degree of enzyme immobilization is attained within the pores.

SPECIFIC EMBODIMENTS

In the illustrative examples that follow, the enzyme utilized was crude papain. Both the enzyme and the enzyme assay procedure are described in U.S. Pat. No. 3,556,945.

The water-insoluble crosslinking agent used was 1,6-diisocyanathohexane, hereinafter referred to as DICH.

The inorganic carrier used was porous glass. Porous glass refers to a glass having an intricate network of minute interconnected voids and channels formed by subjecting a phase separated glass to at least one etching cycle which dissolves one of the phases. Further information on how to form such glass may be found in U.S. Pat. No. 2,106,764 issued to Hood et al., U.S. Pat. No. 3,485,687 issued to Chapman, both assigned to the present assignee, and U.S. Pat. No. 3,544,524, issued to Haller. The glass used below had an average pore diameter of 550 A., an average pore volume of 1.0 to 1.2 cc./g., a surface area of 40 m.$^2$/g., and was 60/80 mesh. The glass was cleaned ultrasonically in 0.2 N HNO$_3$, and then heated at 525° C.

It should be noted, however, that since the present invention is concerned with more fully utilizing the pores of inorganic carriers, numerous carriers may be used as long as they have a porosity such that enzymes can be both adsorbed and crosslinked within the pores. The net effect is a greater utilization of pore volume and the provision of an environment for the enzyme which is less turbulent than that available when the pore volume was not so utilized. Thus, various porous inorganic bodies may be used, e.g., porous glass, dried inorganic gels such as those of Al$_2$O$_3$ and TiO$_2$, and naturally occurring porous inorganic bodies (e.g., diatomaceous earth), each having average pore diameters which will provide "protection" for the adsorbed and crosslinked enzymes and a generally large surface area for loading the enzyme. Preferably, the average pore diameter is between about 300 A. to 1,000 A., depending on such factors as enzyme and substrate sizes, to assure maximum protection against the turbulence and a desirably large surface area (protected by the pores) per gram of carrier.

The type of crosslinking agent used will depend on the type of enzyme to be crosslinked. These agents are known in the art and their preferred concentration for a given crosslinking operation within the pores can be readily determined through simple experimentation by one skilled in the art. The only general requirement for a particular crosslinking agent is that it be essentially water insoluble and polyfunctional. Examples of such essentially water-insoluble, polyfunctional crosslinking agents are compounds of the following general formula:

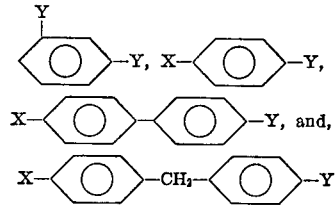

wherein X and Y are selected from the group consisting of diazonium salts such as —N$_2^+$Cl$^-$; aldehydes (—CHO); isocyanate (—N=C=O); hydroxyl (—OH); isothiocyanate (—N=C=S); acyl halides such as acyl chloride (—C—O—Cl); acid amides (—C—ONH$_2$); amines (—NH$_2$); carboxyl (—COOH); sulfhydryl (—SH); sulfonyl halide such as sulfonyl chloride (—SO$_2$Cl); halides, and imides such as butanimide.

The above bifunctional crosslinking agents are essentially water insoluble, and, as noted above, the choice of a particular crosslinking agent will depend on the enzyme to be crosslinked. Thus, those skilled in the art will recognize which functional groups can be used to effect crosslinking while not interfering with the active sites of a given enzyme. The crosslinking agents must have at least two functional groups.

The duration of the adsorption and crosslinking steps will vary depending on such factors as pore size of the carrier and enzyme size and the optimum periods for these steps can be readily determined by one skilled in the art. The time periods used in the example below were chosen to assure maximum amounts of adsorption and crosslinking although it is thought periods of lesser duration are feasible.

EXAMPLE I BY PROCEDURE 1

Papain solution: 200 mg. of crude papin (Nutritional Biochemical Corp.) was diluted to 10 ml. with 0.1 M phosphate buffer pH 8.1, dissolved, and placed in a 5° C. water bath. 100 mg. of porous glass was transferred to a 10 ml. graduated cylinder and reacted in the 5° C. bath with reciprocal shaking for 25 minutes. Shaking was then stopped and the adsorption was allowed to proceed at 5° C. without shaking for about 14½ hours. Adsorption was then continued for a 30 minute period with reciprocal shaking at 5° C. after which the remaining enzyme solution was decanted.

An ethyl ether solution containing 0.05 mg. DICH per ml. was precooled to 5° C. after which 0.5 ml. (0.025 mg. DICH) was added to the glass in the 5° C. bath. The sample was then reciprocally shaken with the crosslinking agent for 4½ hours at 5° C. The sample and crosslinking agent was then diluted with 10 ml. of disilled water, and shaking in the 5° C. bath was continued for 15 minutes.

The sample was then washed thoroughly with water and an activator solution of cysteine and ethylene diaminetetraacetate (EDTA) over a fritted glass funnel. The cysteine-EDTA solution activates the enzyme by reducing it and removing metal ion inhibitors, and such an activation technique is well known in the art. The thus-treated glass was finally transferred to a 25 ml. flask in which it was stored and analyzed. The same 100 mg. sample was assayed with casein at pH 5.8, 40° C. repeatedly over the course of storage in distilled water at room temperature. The assay results over about a two-month storage period are given below. The first figures in each pair of columns refers to the storage time in days at which the assays were made. The second figure represents the activity found in mg. of crude papain per gram of glass.

TABLE I

| Days | Activity |
|---|---|
| 0 | 11.4 |
| 1 | 10.8 |
| 3 | 11.2 |
| 6 | 12.4 |
| 8 | 13.6 |
| 13 | 10.8 |
| 17 | 9.0 |
| 27 | 8.4 |
| 43 | 6.6 |
| 51 | 6.6 |
| 61 | 4.2 |

EXAMPLE II BY PROCEDURE 2

Papain solution: 100 mg. papain was diluted to 5 ml. with 0.2 M phosphate buffer, pH 8.1, allowed to dissolve and then placed in a 5° C. water bath. A DICH solution of 0.05 mg. DICH per ml. in ethyl ether was precooled to 5° C. Porous glass (100 mg.) was transferred to a 10 ml. graduated cylinder. A 0.5 ml. (0.025 mg.) portion of the DICH solution was added to the glass in the cylinder and then placed in a cold room (8° C.) for 30 minutes. The cylinder and its contents were then placed in a 40° C. bath with reciprocal shaking. Ether was evaporated from the contents of the cylinder in the 40° C. bath until the sample was dry (5 minutes). The cylinder and the treated glass were then transferred to a 5° C. bath.

Then, 0.5 ml. (10 mg.) of the papain solution was added to the treated glass and allowed to react in the 5° C. bath with reciprocal shaking for 2 hours. The shaking was then stopped and the reaction was allowed to continue in the 5° C. bath for an additional 45 minutes, after which 10 ml. of distilled water was added and the sample was again shaken in the 5° C. bath for 5 minutes. The enzyme and water was decanted and the sample was thoroughly washed over a fritted glass funnel with water and then treated with an activator solution of cysteine and EDTA. The sample was stored, handled, and assayed in the same manner as in Example 1. The assay results over a two-month period are shown below.

TABLE II

| Days: | Activity |
|---|---|
| 0 | 8.2 |
| 1 | 8.8 |
| 2 | 8.8 |
| 4 | 9.2 |
| 7 | 9.6 |
| 9 | 8.2 |
| 14 | 10.2 |
| 18 | 7.8 |
| 24 | 8.4 |
| 44 | 5.6 |
| 52 | 5.6 |
| 62 | 1.0 |

EXAMPLE III BY PROCEDURE 1

Papain solution: 100 mg. papain was diluted to 5 ml. with 0.1 M phosphate buffer, pH 7.9. allowed to dissolve and then placed in a 5° C. water bath. A DICH solution of 0.2 mg. DICH per ml. in methanol was prepared and precooled to 5° C.

100 mg. of porous glass was placed in a 10 ml. graduated cylinder and the cylinder was placed in a 5° C. water bath. Then, 2 ml. (40 mg.) papain solution was then added to the glass and allowed to react without shaking for 1 hour and 50 minutes in the 5° C. bath. The cylinder and contents were then reciprocally shaken in the 5° C. bath for a two-hour period after which the reaction was allowed to proceed without shaking for 15½ hours. Then, the cylinder and its contents were reciprocally shaken for 15 minutes in the 5° C. bath after which the enzyme solution was finally decanted.

The glass was then washed with two 10 ml. volumes, followed by one 4.5 ml. volume of distilled water in the 5° C. bath with reciprocal shaking over 30 minute intervals for each wash.

A 0.2 ml. (0.04 mg.) aliquot of the precooled DICH-methanol solution was added to the glass and reacted in the 5° C. bath with reciprocal shaking for 3 hours and 5 minutes after which the sample and crosslinking agent was diluted to 10 ml. with distilled water and the reaction was continued with reciprocal shaking for an additional 1½ hours in the 5° C. bath. The sample was then thoroughly washed with water over a fritted glass funnel. The sample was then stored, handled, and assayed in the same manner as in Example I and the assay results are given below.

TABLE III

| Days: | Activity |
|---|---|
| 0 | 40.8 |
| 0, 1 hr. | 36.4 |
| 3 | 36.0 |
| 5 | 360. |
| 10 | 33.2 |
| 14 | 26.6 |
| 24 | 24.0 |
| 41 | 20.4 |
| 49 | 13.4 |
| 59 | 6.0 |

EXAMPLE IV BY PROCEDURE 2

The papain and DICH solutions were the same as those used in Example 3 above.

100 mg. of porous glass was transferred to a 10 ml. graduated cylinder and placed in a 5° C. water bath. Then, 0.2 ml. (0.04 mg.) DICH-methanol solution was added to the glass. The solution was completely absorbed in the pores of the glass and the glass particles appeared to be dry. The cylinder containing the glass was reciprocally shaken in the 5° C. bath for 25 minutes. Then, 2 ml. (40 mg.) of the papain solution was added and reacted without shaking in the 5° C. bath for 1 hour and 50 minutes. The cylinder and contents were then reciprocally shaken in a 5° C. bath for a two-hour period after which the reaction was allowed to proceed without shaking at 5° C. for 15½ hours. The cylinder and its contents were then finally reciprocally shaken in the 5° C. bath for 15 minutes and the enzyme solution was then decanted. The glass was then washed in the same manner as Example 3. The sample was likewise stored, handled, and assayed as in Example 1, and the assay results are given below.

TABLE IV

| Days: | Activity |
|---|---|
| 0 | 32.4 |
| 0, 1 hr. | 30.4 |
| 3 | 31.4 |
| 5 | 28.8 |
| 10 | 29.8 |
| 14 | 19.8 |
| 24 | 23.6 |
| 41 | 21.2 |
| 49 | 13.4 |
| 59 | 6.6 |

By comprising the results of Examples 1 and 2 with the results of Examples 3 and 4, it appears clear that the amount of enzyme retained by the glass over a two-month period is related to the amount of enzyme originally contacted with the glass. However, when lesser amounts of the enzyme were used, as in Examples 1 and 2, the storage stability of the enzyme remained more nearly constant. Thus, in those applications where it would be desirable to be reasonably certain of the enzyme activity over a prolonged period of time, a similar ratio of enzyme to glass would be used.

EXAMPLE V

To have a basis for comparing the effects of the crosslinking techniques described in Examples 1 through 4 with glass on which the enzyme had been merely adsorbed, the following experiment was done.

Using a papain solution of 20 mg. papain per ml. water, the enzyme was adsorbed on 100 mg. of porous glass according to the method disclosed in U.S. Pat. No. 3,556,945. The adsorption took place at 5° C. and from past studies it was expected that the bulk of the enzyme would be adsorbed by the porous glass within the first 20 minutes of contact at that temperature. The adsorbed enzyme was stored, handled and assayed in the same manner as Examples 1–4 and the assay results are given below.

TABLE V

| Days: | Activity |
|---|---|
| 0 | 26.0 |
| 1 | 23.4 |
| 5 | 21.6 |
| 7 | 20.4 |
| 12 | 21.2 |
| 14 | 16.6 |
| 16 | 14.4 |
| 19 | 11.0 |
| 26 | 9.2 |
| 41 | 4.6 |

As had been expected, the porous glass initially adsorbed a higher amount of enzyme per gram of glass. However, the stability of the adsorbed enzyme over a 41-day period was less than that found in any of the Examples 1–4 where crosslinking had been brought about within the pores. It is believed the loss in stability is due to the fact that the enzyme was not as well immobilized on the surface and within the pores of the glass as when crosslinking had been accomplished.

Example VI

A final experiment was performed to determine the effects of varying the amounts of crosslinking agents on the stability of the insolubilized enzyme composite. In this example, procedure 2 was used at four concentrations. The concentrations of DICH used were 0, 0.01, 0.1, and 1.0 mg. of DICH per ml. of methanol. The papain solution used consisted of 80 mg. papain per ml. of water and attempts were made to adsorb and crosslink the papain within the pores and on the surface of 100 mg. of the porous glass by procedure 2. The samples were stored, handled, and assayed by the same methods given above. The results of the assays over a two-month period when varying amounts of DICH were used are given below. The numbers below the amounts of crosslinking agent and across from the storage days represent the activities of the samples.

TABLE VI

| | Crosslinking agent DICH(mg.) | | | |
|---|---|---|---|---|
| | 0 | 0.01 | 0.1 | 1.0 |
| Days: | | | | |
| 0 | 43.6 | 43.2 | 31.4 | 15.2 |
| 1 | 43.2 | 39.6 | 29.0 | 16.0 |
| 9 | 46.4 | 44.4 | 35.0 | 18.8 |
| 15 | 42.0 | 39.2 | 33.4 | 18.6 |
| 24 | 28.0 | 28.8 | 30.6 | 16.8 |
| 35 | 22.4 | 20.6 | 28.8 | 17.4 |
| 49 | 13.8 | 14.6 | 21.4 | 16.8 |
| 59 | 5.6 | 5.8 | 11.6 | 8.8 |

As can be seen above, when a 0 or 0.01 mg. per ml. concentration of DICH was used, the initial retention of papain was higher than when greater concentrations of DICH were used. However, when 0.1 mg./ml. and 1.0 mg./ml. solution of DICH was used, the stability of the samples over a two-month period was greater as represented by the more constant activity determinations, especially after 15 days of storage. Thus, where prolonged stability for the enzyme composite is desired, increasing concentrations of the crosslinking agent would be used, even though the initial activity will not be as high as when a low concentration of the crosslinking agent were used.

It is intended that the above examples should be construed as illustrative of the principles of this disclosure and that the scope of this invention should be limited only by the appended claims.

I claim:

1. A method of adsorbing and crosslinking papain within the pores and on the surface of a porous glass carrier which comprises the steps of:
   (a) contacting the porous carrier with an aqueous papain solution to adsorb papain within the pores and on the surface of the carrier;
   (b) removing the carrier from the solution; and,
   (c) contacting the carrier with a solution of 1,6-diisocyanathohexane in an organic solvent.

2. The method, as claimed in claim 1, wherein the porous glass carrier of step (a) consists of porous glass particles having a particle size of about 60 to 80 mesh and an average pore diameter of about 550 A.

3. The method, as claimed in claim 1, wherein the solvent for the 1,6-diisocyanathohexane of step (c) is selected from the group consisting of ethyl ether and methanol.

4. The method, as claimed in claim 1, wherein the porous glass carrier of step (a) consists of porous glass particles having a particle size of about 60 to 80 mesh and an average pore diameter of about 550 A., and the solvent for the 1,6-diisocyanathohexane solution of step (c) is selected from the group consisting of ethyl ether and methanol.

5. A method of adsorbing and crosslinking papain within the pores and on the surface of a porous glass carrier which comprises the steps of:
   (a) contacting a dry porous glass carrier with a solution of 1,6-diisocyanathohexane in an organic solvent;
(b) removing the carrier from the solution; and
(c) contacting the carrier with an aqueous papain solution to adsorb and crosslink papain within the pores and on the surface of the carrier.

6. The method, as claimed in claim 5, wherein the porous glass carrier of step (a) consists of porous glass particles having a particle size of about 60 to 80 mesh and an average pore diameter of about 550 A.

7. The method, as claimed in claim 5, wherein the organic solvent for the 1,6-diisocyanathohexane solution of step (a) is selected from the group consisting of ethyl ether and methanol.

8. The method, as claimed in claim 5, wherein the porous glass carrier of step (a) consists of porous glass particles having a particle size of about 60 to 80 mesh and an average pore diameter of about 550 A., and the solvent for the 1,6-diisocyanathohexane solution of step (a) is selected from the group consisting of ethyl ether and methanol.

References Cited

UNITED STATES PATENTS

| | | | |
|---|---|---|---|
| 3,556,945 | 1/1971 | Messing | 195—Dig. 11 |
| 3,705,084 | 12/1972 | Reynolds | 195—63 |
| 3,669,841 | 6/1972 | Millet | 195—63 |

DAVID M. NAFF, Primary Examiner

U.S. Cl. X.R.

195—63, Dig. 11

UNITED STATES PATENT OFFICE
CERTIFICATE OF CORRECTION

Patent No. 3,804,719          Dated April 16, 1974

Inventor(s) Ralph A. Messing

It is certified that error appears in the above-identified patent and that said Letters Patent are hereby corrected as shown below:

Column 1, line 38, "chemical" should be -- chemicals --.

Column 1, line 65, after "cross-" insert -- linked by various cross- --.

Column 4, line 64, "halide" should be -- halides --.

Column 6, Table III, line 62, under heading "Activity", "360." should be -- 36.0 --.

Signed and sealed this 1st day of October 1974.

(SEAL)
Attest:

McCOY M. GIBSON JR.
Attesting Officer

C. MARSHALL DANN
Commissioner of Patents